(12) United States Patent
Nguyên et al.

(10) Patent No.: US 8,628,612 B2
(45) Date of Patent: Jan. 14, 2014

(54) PROCESS FOR PREPARING A FILLER FOR ASPHALT OR CONCRETE STARTING FROM A SLAG MATERIAL

(75) Inventors: Evelyne Nguyên, Sint-Lambrechts-Woluwe (BE); Dirk Van Mechelen, Tisselt (BE)

(73) Assignee: Recmix Belgium, Sint-Truiden (BE)

( * ) Notice: Subject to any disclaimer, the term of this patent is extended or adjusted under 35 U.S.C. 154(b) by 0 days.

(21) Appl. No.: 12/602,009

(22) PCT Filed: Jun. 2, 2008

(86) PCT No.: PCT/EP2008/056772
§ 371 (c)(1),
(2), (4) Date: Dec. 15, 2009

(87) PCT Pub. No.: WO2008/145758
PCT Pub. Date: Dec. 4, 2008

(65) Prior Publication Data
US 2010/0170421 A1      Jul. 8, 2010

(30) Foreign Application Priority Data
May 31, 2007    (WO) ................. PCT/EP2007/055341

(51) Int. Cl.
| | | |
|---|---|---|
| C04B 5/00 | (2006.01) | |
| C04B 7/14 | (2006.01) | |
| C04B 28/08 | (2006.01) | |
| C04B 14/40 | (2006.01) | |
| C04B 14/12 | (2006.01) | |
| C04B 16/08 | (2006.01) | |
| C04B 38/00 | (2006.01) | |
| C09C 1/22 | (2006.01) | |
| B02C 13/00 | (2006.01) | |
| B02C 17/02 | (2006.01) | |
| B02B 7/00 | (2006.01) | |
| C22B 1/00 | (2006.01) | |
| C22B 1/14 | (2006.01) | |

(52) U.S. Cl.
USPC ............... 106/789; 241/81; 241/79; 106/624; 106/457; 106/602; 75/746

(58) Field of Classification Search
USPC ......... 106/789, 454, 284, 461, 457, 624, 602; 241/79, 81; 75/746
See application file for complete search history.

(56) References Cited

U.S. PATENT DOCUMENTS 3,868,441 A * 2/1975 Agee et al. ...................... 423/69
4,666,591 A * 5/1987 Imai et al. ....................... 209/38
4,981,519 A * 1/1991 Fukaya et al. ................. 106/782

FOREIGN PATENT DOCUMENTS

| CN | 1557560 | 12/2004 |
|---|---|---|
| EP | 837 043 | 4/1998 |
| FR | 2 666 098 | 2/1992 |
| GB | 2 320 494 | 6/1998 |
| JP | 2002-211960 | 7/2002 |
| JP | 2004-51425 | 2/2004 |

OTHER PUBLICATIONS

Juckes, L.M. "Dicalcium Silicate in Blast-furnace slag: A Critical Review of the Implications for Aggregate Stability". Institution of Mining and Metallurgy, Transactions C, vol. 111, 2002 [Retrieved on May 22, 2012].*

"Steel-Slag as Filler Material in Concrete", H. Moosberg-Bustnes, VII International Conference on Molten Slags Fluxes and Sales, The South African Institute of Mining and Metallurgy, 2004, pp. 385-391.

Written Opinion in PCT/EP2008/056772 (5 pages).

* cited by examiner

*Primary Examiner* — Kaj K Olsen
*Assistant Examiner* — Karam Hijji
(74) *Attorney, Agent, or Firm* — McCracken & Frank LLC

(57) ABSTRACT

The present invention relates to a process for preparing, starting from a slag material, a filler for construction materials which contain bitumen or a hydraulic binding agent. The slag used to prepare the filler contains γ-dicalcium silicate. The process comprises the step of removing from the slag material a finer fraction formed by particles of a size between 0 and at least 0.75 mm so as to reduce the γ-dicalcium silicate content of the slag material; and the step of finely milling at least a portion of the remaining coarser fraction of the slag to obtain the filler. The invention also relates to the obtained filler, to the use thereof for preparing construction materials and to concrete or mortar compositions and asphalt compositions containing the filler. By removing the finer fraction from the slag material, a filler is obtained which has a considerably lower water content so that it becomes suitable for use in asphalt or concrete or mortar compositions, in particular in self-compacting concrete compositions.

27 Claims, 2 Drawing Sheets

PROCESS FOR PREPARING A FILLER FOR ASPHALT OR CONCRETE STARTING FROM A SLAG MATERIAL

BACKGROUND OF THE INVENTION

1. Field of the Invention

The present invention relates to a process for preparing, starting from a slag material, a filler for use in construction materials which contain a hydraulic or bituminous binding agent. The construction materials are in particular asphalt or hydraulic mortar or concrete compositions.

2. Description of the Background of the Invention

Fillers are used in several construction materials. The different types of asphalt, such as asphalt concrete, pouring asphalt, draining asphalt and split (stone) mastic asphalt (SMA), contain for example amounts of filler ranging between 4 and 23% by weight. Fillers can also be added to hydraulic mortar or concrete compositions, in particular to self-compacting concrete compositions, to improve the fluidity of the fresh mix.

Self-compacting concrete (SCC) compositions are hydraulic concrete mixtures characterised by a high fluidity, making vibration unnecessary for placing and compaction. SCC compositions flow instead of slumping, filling even complicated formwork with dense reinforcement. The hardened concrete is particularly dense and homogeneous, giving it particularly good strength and durability. SCC compositions comprise a particularly high ratio of filler and have a high resistance to segregation. Their high fluidity is obtained using superplasticizer admixtures, in particular polycarboxylates, whilst limiting the water content to a minimum to maintain the strength of the cured concrete and to avoid segregation of the mixture.

Up to date, crushed limestone has been the main source of filler for hydraulic mortar or concrete compositions and also for asphalt compositions. However, limestone is a natural and non-renewable material. Moreover, other users, such as the food industry, also consume large quantities of this limited resource, further increasing its cost. For this reason, alternatives to limestone, in the form of waste materials, have long been sought.

The European Guidelines for Self-Compacting Concrete, dated May 2005, disclose for example different additions (fillers) which can be incorporated in self-compacting concrete to improve certain properties or to achieve special properties. Calcium carbonate based mineral fillers are described to be particularly suitable for SCC compared with other available materials but, as described hereabove, calcium carbonate (limestone) is a natural, non-renewable material. According to the European Guidelines fly ash would also be suitable but high levels of fly ash may produce a paste fraction which is so cohesive that it can be resistant to flow. Silica fume would result in good cohesion and improved resistance to segregation but it is also very effective in reducing or eliminating bleed which can give rise to problems of rapid surface crusting. Ground granulated blast furnace slag (GGBFS), which is usually over 95% wt. amorphous (due to being rapidly cooled by quenching in water) and which has hydraulic properties, can also be added to SCC but a high proportion of GGBFS may affect the stability of SCC resulting in reduced robustness with problems of consistence control while slower setting can also increase the risk of segregation. Due to its hydraulic properties GGBFS is moreover a valuable raw material for use as cement additive or for the production of cement clinker. Ground blast furnace slag, slowly cooled so as to be majoritarily crystalline, is also disclosed in the European Guidelines as a possible addition to SCC. However, blast furnace slag has also valuable applications as aggregate (blast furnace slag gravel) and may for example be used in building of roads, in civil engineering, in construction of railway track banks, in field arrangements, recultivation, etc. For such applications, the blast furnace slag should preferably be of a high quality, i.e. it should not have been pulverised during the cooling process as a result of an expansive conversion of β-dicalcium silicate crystals into their γ-polymorph ("falling" of the slag). Such γ-dicalcium silicate containing blast furnace slags are therefore less appropriate for being used as aggregate.

Japanese patent application JP 2004-051425 appears to suggest that the remaining β-dicalcium silicate portion in the slag can be used as a cement additive, but it does not disclose how this portion is to be separated from the γ-polymorph. Instead it concentrates on a process for treating the γ-dicalcium silicate so as to use it as a hydraulic cement additive. Moreover, contrarily to what appears to be suggested in this document, crystalline dicalcium silicates in general, and β-dicalcium silicate in particular, do not possess substantial hydraulic properties. The hydraulic properties of the disclosed mainly relate to its amorphous portion and to the adjunction of additional amorphous pozzolanic slag.

In the article "The use of stainless steel slag in concrete", A. Kortbaoui, A. Tagnit-Hamou, and P. C. Aïtin, Cement-Based Materials, p. 77-90, 1993, it was proposed to use "treated" stainless steel slag (TSSS) as a substitute for sand in concrete mixes. The described "treated" stainless steel slag was relatively fine and also comprised a small portion of a filler fraction (about 18% of the particles were smaller than 63 μm). However, the experiments demonstrated that the amount of TSSS used to replace natural sand was limited by the negative effect on the workability of the fresh concrete. Moreover, notwithstanding the fact that a quite large amount of superplasticizer was added to improve the workability of the concrete, the slump flow was still reduced. This negative impact on the workability of the fresh concrete composition makes the TSSS inadequate for use as filler in concrete and in particular in self-compacting concrete, as defined by the European Guidelines for Self-Compacting Concrete, of May 2005.

Japanese patent application JP 2002-211960 suggested treating a stainless steel slag with a mineralogical stabiliser, so as to at least partially prevent the conversion of β-dicalcium silicate crystals. However, such a process involves substantial costs, both in terms of raw materials (the mineralogical stabiliser) and of installations and energy.

For asphalt an important property of the filler is its water content. In practice, the water content of the filler used for the preparation of asphalt should be smaller than 1% by weight (see for example the European standard EN 13043:2002) and preferably even smaller than 0.5% by weight. Higher water contents would indeed result in the inclusion of water or water vapour in the bituminous mixture which is to be avoided in order to prevent the formation of a too greasy appearance and the risk on segregation or stripping of the mixture during its application. While fillers containing a substantial amount of γ-dicalcium silicate can theoretically be dried down to such a low water content, in practice their water retention is so high that the cost is prohibitive. Moreover, as soon as the material is back in a normal atmosphere and temperature, it starts rapidly absorbing water again, making its use unpractical in any case. The retained water forms a film around the slag particles which prevents a good adherence of the strongly hydrophobic bituminous binder to the particles. Even when the asphalt is laid, water may penetrate into the asphalt and into the filler particles thus causing again stripping possibly leading to rut formation (in road applications) and tear formation.

SUMMARY OF THE INVENTION

An object of the present invention is to provide a process for preparing a filler for construction materials which enables to start from alternative slag materials which, when milled as such, would result in a filler which would be little or even not suitable at all for use as filler in bituminous or hydraulic construction materials.

To this end the process according to the invention is characterised in that use is made of a slag material which contains γ-dicalcium silicate and in that the process comprises the step of removing a finer fraction, formed by particles of a size between 0 and y mm, from the slag material, y being larger than or equal to 0.75 mm, preferably larger than or equal to 1.0 mm, more preferably larger than or equal to 1.5 mm and most preferably larger than or equal to 2.0 mm; and the step of finely milling at least a portion of the remaining coarser fraction of the slag material to obtain a filler of which at least 50% by weight, preferably at least 60% by weight, is formed by particles not bigger than 63 μm. This provides a sufficiently fine filler for use in asphalt, concrete and/or mortar, in particular self-compacting concrete, which needs such fine filler to preserve its fluidity in the fresh state and obtain smooth surfaces after setting.

Slags which contain γ-dicalcium silicate are for example air-cooled blast furnace slags which are fragmented due to the fact that they contain β-dicalcium silicate which has inverted expansively to its γ-form, and relatively slowly cooled steel and stainless steel slags, in particular special stainless steel slags produced during the production of austenitic nickel-chromium stainless steel.

The present inventors have found that the fine fraction of such γ-dicalcium silicate containing slags, which at first sight would appear to be preferable for preparing a filler material since, in contrast to the coarser aggregate fraction, it has no practical uses and, being finer, needs less grinding, actually is not suitable at all to be used as filler in bituminous or hydraulic construction materials but that, quite surprisingly, the coarser fraction of such slags is a very suitable material for preparing a filler for such construction materials.

This difference in filler properties can possibly be explained by the fact that the fine fraction of the crystalline slag has a much higher γ-dicalcium silicate content than the coarser fraction. The presence of too high amounts of γ-dicalcium silicate, which can absorb large quantities of water, would have deleterious effects, for instance, on the workability and durability of the mortar or the concrete. A dry stainless steel slag that contains γ-dicalcium absorbs and strongly retains a lot of water. As a result of this, more water and water reducing additives are needed to maintain the minimum workability of the concrete mixture. When adding too much water in order to improve the fluidity, the water contained in the mixture will form small voids to the detriment of the strength and durability of the mortar or concrete. Also for applications as filler in asphalt compositions, a filler containing a too high amount of γ-dicalcium silicate is not suitable in view of the high amounts of water absorbed and strongly retained by this γ-dicalcium silicate. Although the pulverisation of the γ-dicalcium silicate was known to the skilled person, from for example JP 2004-051425, it has now been found that a qualitative filler can be obtained by first removing a fine fraction from the slag so that a comparatively γ-dicalcium-silicate-poor fraction remains, and by then finely grinding this remaining fraction into filler-sized particles.

In an advantageous embodiment of the process according to the invention the slag material comprises a steel slag, preferably a stainless steel slag and more preferably a slag produced during the production of austenitic nickel-chromium steel.

For the production of stainless steel use is not only made of iron but additionally also at least of chromium. For martensitic stainless steel types, the chromium content comprises for example about 13%, for ferritic stainless steel types about 17.5% and for austenitic steel types about 17.5-18%. Austenitic stainless steel types comprise moreover additionally about 9 to 12% of nickel. For the production of stainless steel, use is further usually made of calcium fluoride which is added more particularly for keeping the molten slag fluid. Stainless steel slag consequently contains from an environmental-hygienical point of view problematic amounts of chromium oxide ($Cr_2O_3$) and possibly of nickel oxide and/or of fluorides. Since these harmful substances may leach out, the disposal of stainless steel slag is complicated and expensive.

To address these problems, European patent EP 0 837 043 B1 proposed using a coarse fraction of the crushed crystalline stainless steel slag as a coarse aggregate for hydraulic concrete and asphalt compositions after having removed the metal particles from the crushed slag. However, in practice, the coarse aggregate still contains a significant amount of valuable metal (nickel-chromium steel). Economically, it is advantageous to be able to recover as big an amount of this metal as possible, including such metal as may be present in quite small inclusions. While it would therefore be advantageous, from that point of view, to be able to mill the slag as finely as possible in order to recover a higher amount of metal, there is in practice already a large amount of fine slag fraction (0-0.5 mm) for which no practical applications exist and which therefore has to be dumped. For the fine stainless steel slag fraction, EP 0 837 043 discloses the possibility to grind this fine fraction (0-4 mm) further and to use the obtained powder for the production of cement. However, the chromium content of the stainless steel slags limits the application of these stainless steel slag powders in cement.

Producing filler from stainless steel slag with the process of the invention allows the recycling of stainless steel slag in an ecologically responsible but economically efficient manner. Hardened construction materials comprising filler prepared by this method do not show significant leaching of heavy metals or other environmentally harmful substances. Treating stainless steel slag by the process of the present invention, thus, not only has the advantage of providing economically advantageous filler for construction materials, but also provides an economically and ecologically advantageous method for the disposal of stainless steel slag.

Preferably, said process additionally comprises the step of breaking the slag material into fragments smaller than a size x before removing the finer fraction from the slag material. Even more preferably, said size x is at most 50 mm, preferably at most 30 mm, and more preferably at most 20 mm. By "breaking" of the slag material is to be understood any process by which the size of the slag pieces or particles is reduced such as by crushing, grinding, etc. Apart from facilitating the handling of the slag for removing the fine fraction, and enabling the extraction of larger amounts of metal inclusions in the slag for their recycling, this preliminary breaking step helps to separate additional soft γ-dicalcium silicate from the larger slag fragments, resulting in a filler with a lower content in γ-dicalcium silicate. The slag material should preferably however not be broken too finely since in this way this would complicate the removal of the fine fraction and since more slag material which is useful as filler would be lost. Consequently, the slag material is preferably broken into fragments smaller than x, with x being preferably larger than 4 mm, more preferably larger than 8 mm and most preferably larger than 10 mm.

Preferably, said process also comprises the step of introducing a mineralogical stabiliser, such as borate which stabilises β-dicalcium-silicate, in the molten slag before cooling said molten slag to provide the γ-dicalcium silicate containing crystalline slag. The purpose of this additional step is to counter, at least partially, the transition from β-dicalcium silicate to γ-dicalcium silicate, thus increasing the ratio of the first to the second in the crystallised slag, and ultimately resulting in a filler with a lower content in γ-dicalcium silicate, while reducing the amount of fine crystalline slag fraction that has to be removed.

Preferably, said process further comprises the step of removing metal, in particular iron-containing metal, from the finely milled portion of the coarse slag fraction. This allows the extraction of a significant amount of the metal left in the slag, which can then be economically recycled. Even more preferably, said metal is extracted by a dry separation process out of the finely milled portion of the coarse slag fraction, in particular by centrifuging this finely milled portion.

The invention also relates to a filler produced by the process according to the invention.

Preferably, the filler comprises a crystalline phase which contains less than 4% by weight, preferably less than 3% by weight and more preferably less than 2% by weight of γ-dicalcium silicate. This substantially prevents the negative effects of the presence of γ-dicalcium silicate in bituminous or hydraulic mortar or concrete compositions and enables more particularly to lower the water content much more easily. The filler preferably has a water content of less than 1.0% by weight and more preferably of less than 0.5% by weight.

The invention also relates to a filler for use in construction materials which contain bitumen or a hydraulic binding agent, such as asphalt, mortar and concrete, in particular self-compacting concrete, which filler is preferably produced by the process according to the invention and which filler comprises crystalline phases which contain, as a whole, at least 1% by weight of β-dicalcium silicate and, per part of by weight of δ-dicalcium silicate, less than 0.8 parts by weight, preferably less than 0.65 parts by weight and more preferably less than 0.5 parts by weight of γ-dicalcium silicate, the content of γ-dicalcium silicate being less than 4% by weight, preferably less than 3% by weight and more preferably less than 2% by weight of said crystalline phases. This enables the recycling of slag containing crystalline dicalcium silicate in filler of adequate workability.

Preferably, the coarser slag material fraction is finely milled so that at least 60% by weight, preferably at least 80% by weight, more preferably at least 90% by weight of the filler is formed by particles not bigger than 125 μm, preferably not bigger than 63 μm. The particle size of the filler meets in particular the filler size requirements of the European standards EN 12620:2002 for concrete and EN 13043:2002 for bituminous mixtures. According to these standards the 100% by weight of the filler should pass through a 2 mm sieve, 85 to 100% by weight should pass through a 0.125 mm sieve and 70 to 100% by weight through a 0.063 mm sieve.

Preferably, said slag material is less than 50% amorphous by weight, preferably less than 30% amorphous by weight. Therefore, a process is provided that is suitable for the treatment of mainly crystalline, and therefore substantially non-reactive slag with no significant use as cement substitute.

Preferably, the coarser slag material is milled so finely that the filler has a Blaine value of at least 2000 $cm^2/g$, preferably at least 3000 $cm^2/g$. This is an alternative measure of the filler's fineness and density.

Preferably, the free lime content (calcium oxide) is below 1% by weight. Free lime also has very negative properties in concrete mixes, swelling when it hydrates to form hydrated lime ($Ca(OH)_2$). It is therefore advantageous to reduce its content in the fillers.

Preferably, the free magnesium oxide content is below 3% by weight, more preferably below 2.5% by weight. Magnesium oxide has, like free lime, negative hydration/swelling properties, and should be avoided.

The invention also relates to the use of the filler obtained by the process according to the invention for preparing a construction material which contains bitumen or a hydraulic binding agent, such as asphalt and hydraulic mortar or concrete. Since the filler doesn't absorb much water, it is easy to maintain water content which is sufficiently low, for example lower than 0.5% by weight for asphalt applications and lower than 1% by weight for concrete applications. For concrete applications, also the water demand is an important parameter of the filler, in particular the β-P value. The β-P value is the amount of water which can be added to the filler without achieving a flowing mixture. This value is also low for the filler according to the invention.

The invention further also relates to a hydraulic concrete or mortar composition comprising a filler according to the invention, preferably in a amount of at least 2% by weight, more preferably of at least 3% by weight and most preferably of at least 5% by weight dry matter on the total dry matter of the hydraulic composition. Preferably, the hydraulic composition is a high-fluidity concrete composition, for example a self-compacting concrete composition, also comprising a superplasticizer, for example a polycarboxylate. Such a concrete composition is particularly advantageous for recycling slag, and in particular stainless steel slag, because the high density and homogeneousness of the set concrete results in a better resistance to aggressive substances and environments, and therefore in an even lower leaching of heavy metals, and since a relatively large amount of steel slag filler can be used therein. Moreover, since the concrete also will have to be eventually disposed with after demolition, its durability is also advantageous, since it will postpone the moment of said disposal. Finally, not needing vibration, self-compacting concrete reduces the exposure of workers to the concrete composition and thus also to any harmful substances contained in it.

The invention finally also relates to an asphalt composition which comprises a coarse aggregate fraction comprising mainly particles larger than 2 mm, a fine aggregate fraction comprising mainly particles between 0.063 and 2 mm, a filler fraction comprising mainly particles between 0 and 0.063 mm and bitumen. The filler fraction comprises a filler according to the invention, the filler fraction preferably consisting for at least 20% by weight, preferably for at least 40% by weight and more preferably for at least 60% by weight of the filler according to the invention. Since this filler doesn't absorb much water, it is easy to maintain or lower its water content below 1% by weight, which is advantageous for hydraulic compositions, and even below 0.5% by weight which is advantageous for asphalt compositions.

BRIEF DESCRIPTION OF THE DRAWINGS

A particular embodiment of the invention will now be described illustratively, but not restrictively, with reference to the following figures.

DETAILED DESCRIPTION OF THE DRAWINGS

The process according to the present invention enables to prepare a valuable filler starting from different types of slag materials which contain γ-dicalcium silicate. The slag material used as starting material is crystalline, or at least partially crystalline, and contains preferably at least 50% by weight of crystalline phases. Such substantially crystalline slag materials are produced by cooling metallurgical molten slags down relatively slowly. The slags are in particular iron or steel slags and comprise for example blast furnace slag (not granulated), common steel slags and stainless steel slags, in particular nickel-chromium steel slags. The slag material used to prepare the filler is preferably a stainless steel slag, more preferably a nickel-chromium steel slag, since these slags are difficult to reuse in view of their heavy metal content and since they contain a valuable steel fraction which can effectively be recuperated by the process according to the invention. The nickel-chromium steel slags have a relatively high nickel and especially chromium content, in particular a chromium ($Cr^{3+}$) content which is higher than 1000 mg/kg and a nickel ($Ni^{2+}$) content which is higher than 50 mg/kg. The following description relates therefore to the process for treating a nickel-chromium steel slag. Such a nickel-chromium steel slag has a relatively high nickel and especially chromium content, in particular a chromium ($Cr^{3+}$) content which is higher than 1000 mg/kg and a nickel ($Ni^{2+}$) content which is higher than 50 mg/kg.

Figure 1:
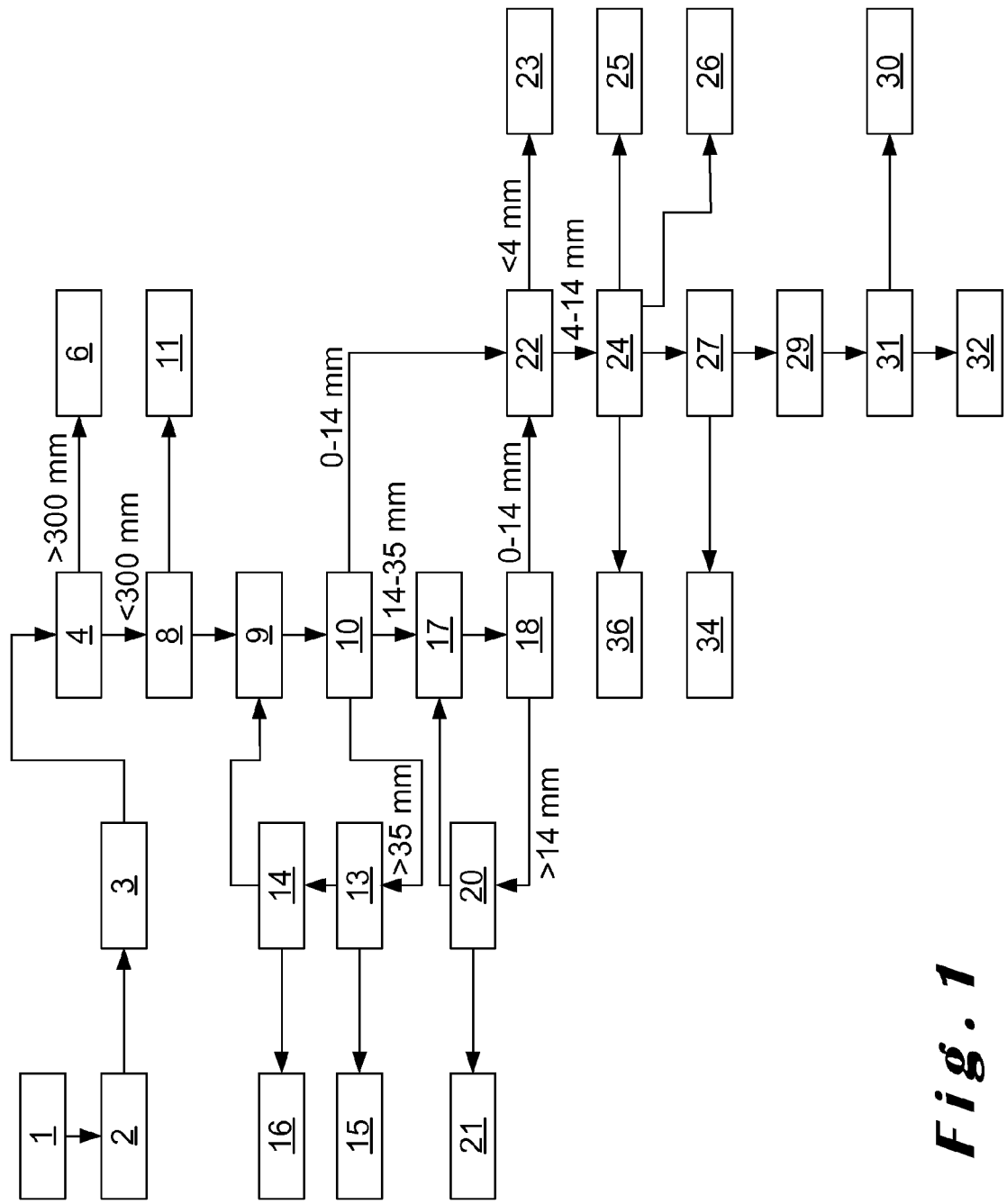
FIG. 1 is a flow chart representing an embodiment of the process of the invention.
Figure 2:
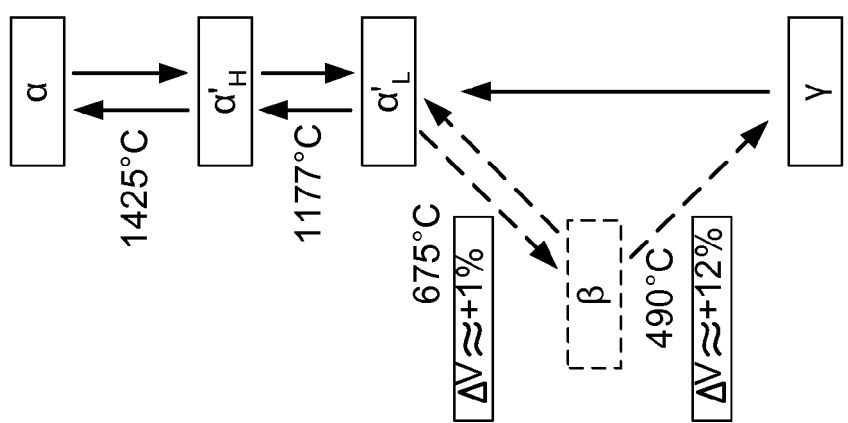
FIG. 2 is a diagram representing the phase transitions during the cooling of dicalcium silicate.

FIG. 1 illustrates a particular embodiment of the process of the invention. In this particular embodiment, the molten lime-silicate slag of a stainless nickel-chromium steel furnace 1 is emptied in buckets 2, and transported in these buckets 2 to cooling pits 3, in which it is left to slowly cool and solidify. To accelerate the cooling, a controlled amount of water is sprayed on the slags. As the cooling is comparatively slow, the slag will not solidify nearly entirely in an amorphous phase, like GBFS, but to a large extent in crystalline phases instead. A significant component of the stainless steel slag is dicalcium silicate ($Ca_2SiO_4$). As crystalline dicalcium silicate cools down, it goes through several polymorphic forms as illustrated in FIG. 2:

α with hexagonal crystal structure, $α_H'$ with orthorhombic crystal structure, $α_L'$ with orthorhombic crystal structure, β with monoclinic crystal structure, and γ with orthorhombic crystal structure.

Figure 3A:
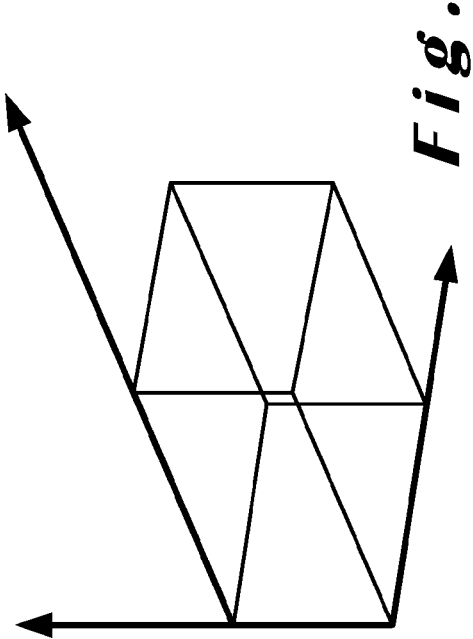
FIG. 3*a* represents the crystal structure of β-dicalcium silicate.
Figure 3B:
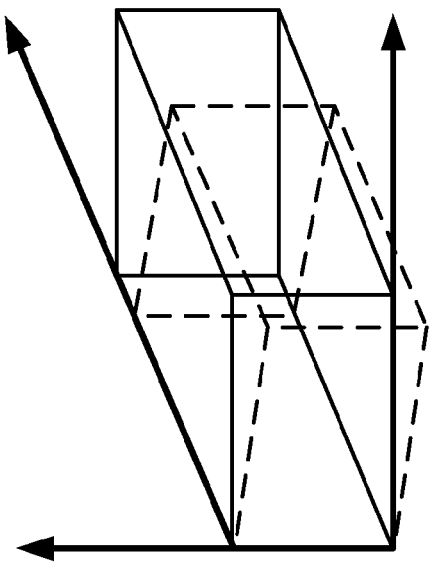
FIG. 3*b* represents the crystal structure of γ-dicalcium silicate.

With pure dicalcium silicate under laboratory conditions, the transition from $α_L'$-dicalcium silicate to β-dicalcium silicate will occur at 675° C., then to be followed by the transition from β-dicalcium silicate to γ-dicalcium silicate at 490° C. However, various external chemical and physical factors may at least partially stabilise the β-dicalcium silicate, preventing the transformation of at least part of the β-dicalcium silicate into γ-dicalcium silicate. So, in the slag, depending on the processes in the furnace 1 and the eventual adjunction of chemical stabilisers, for example a borate such as sodium tetraborate $Na_2B_4O_7$, which are known to the skilled person, a significant fraction of the dicalcium silicate will remain in the β form. This is significant, because β-dicalcium silicate and γ-dicalcium silicate have very different physical properties. As the transition from β-dicalcium silicate to γ-dicalcium silicate involves an increase of 12% in volume due to their different crystal structure, as can be seen in FIGS. 3*a* and 3*b*, it will break up the dicalcium silicate crystals. This results in γ-dicalcium silicate turning into a fine dust. The transition also causes microfissures in the fine γ-dicalcium silicate grains, which appears to explain why this fine dust can absorb large quantities of water. These water absorption properties make this fine γ-dicalcium silicate dust highly unsuitable for most uses in construction, in particular that of filler. However, the inventors have found that this is not the case for the β-dicalcium silicate fraction.

Since even with the adjunction of chemical stabilisers and other measures known to the skilled person, it appears very difficult to completely prevent the formation of γ-dicalcium silicate in mainly crystalline steel slag, and since in any case these measures could interfere with the economical operation of the furnace 1, the following process aims to extract the γ-dicalcium silicate from the slag to produce a product with a high ratio of β to γ dicalcium silicate. Metal is also extracted from the slag during this process for further metallurgical exploitation.

In this process, molten slag is extracted from the stainless steel furnace 1 and brought to cooling pits 3. Comparatively slow cooling within these cooling pits 3 will result in extensive crystallisation of the slag, which will end up with less than 40%, usually between 20-30% amorphous content by weight. To prevent as much as possible the γ-β transition during this cooling, sodium tetraborate $Na_2B_4O_7$, sold under the Dehybor® trademark, or an equivalent product, may have been added to the molten slag in the furnace 1 or afterwards. The preferred quantity of added sodium tetraborate will depend from the basicity index of the molten slag and can be between 1 and 2.5%. After cooling, the solidified slag will be dug from these cooling pits 3 and fed through a hopper 4. The hopper 4 comprises a grid for stopping all oversized slag pieces 6, in this particular case those bigger than 300 mm. As oversized pieces could damage the crushers used in the later process, these oversized pieces 6 are removed for later particular treatment, such as breaking with hammers and extraction of large metal fragments before being fed again through the hopper 4.

The slag particles smaller than 300 mm fall through the hopper 4 onto a first conveyor belt. This first conveyor belt then transports them through a first metal handpicking cabin 8 to a first crusher 9 and a first sieve 10. In the metal handpicking cabin 8, operators remove large metal pieces 11 from the slag particles on the conveyor belt 7. After the slag particles are crushed in the first crusher 9, they go through the first sieve 10 which separates them into three fractions: particles bigger than 35 mm, particles between 14 and 35 mm and particles smaller than 14 mm. The fraction of particles bigger than 35 mm is taken by a second conveyor belt through a second metal handpicking cabin 13 and a first metal separating magnetic belt 14, where more metal pieces 15 and 16 are removed. The particles bigger than 35 mm are then put back into the first crusher 9. The fraction of particles between 14 and 35 mm goes into a second crusher 17 and a second sieve 18, where after being crushed again it is separated into two fractions: a fraction of particles smaller than 14 mm and a fraction of particles bigger than 14 mm. The fraction of particles bigger than 14 mm is taken by a third conveyor belt through a second metal separating magnetic belt 20, where more metal 21 is removed, and back into the second crusher 17.

The fraction of particles smaller than 14 mm from the first sieve 10, and the fraction of particles smaller than 14 mm from the second sieve 18 join again and are put together through the third sieve 22, which separates them into a fraction 23 of particles smaller than 4 mm and a fraction of particles between 4 and 14 mm.

The fraction 23 of particles smaller than 4 mm is rich in fine γ-dicalcium silicate sand and dust. The sand fraction can be used to replace sand in certain applications but the fine fraction (0-0.5 mm) has to be stored for later disposal. The 4-14 mm fraction comprises much less γ-dicalcium silicate, and at least a portion of this fraction is used in the process according to the invention to prepare a valuable filler.

According to the embodiment of the process of the invention illustrated in FIG. 1, the 4-14 mm fraction is brought to a washing jig 24, where remaining metal particles 36 will be separated by density from the non-metal fraction of the slag. This washing jig 24 will also wash off remaining fine sand 25 and dust 26 from the particles of the 4-14 mm fraction. This fine sand 25 and dust 26, also rich in γ-dicalcium silicate, is taken to disposal sand and dust pits.

The remaining 4-14 mm particles are taken through a third metal separation magnetic belt 27 to separate the slag particles in a first portion which have a relatively high metal content, i.e. the so-called middlings, and a second portion 34 which have a lower metal content. This second portion can be used as aggregate in concrete or asphalt as disclosed for example in EP-B-0 837 043.

In the process according to the invention, the filler is preferably made of the middlings since this enables to recycle a larger amount of metal from the slag material. However, it is also possible to prepare the filler from the second portion 34 of the steel slags or from a mixture of middlings and of the second portion 34.

The particles of the slag used to produce the filler are further processed by fine milling in a dry mill 29 into much finer particles. In this particular embodiment, over 98% by weight of the particles is smaller than 63 μm (i.e. passes through a 63 μm sieve). This dry milling will allow recovering even very small metal inclusions 30 in a centrifuge 31. Dry milling has also the advantage that the filler does not have to be dried before use. Table 1 shows the results of a diffractometric analysis of the remaining finely ground particles 32 compared with those of a diffractometric analysis of a 0-0.5 mm fraction separated from the previously extracted 0-4 mm fraction 23.

TABLE 1

Mineralogical composition of the rejected fine fraction
23 and of the finely ground particles 32

| Crystalline phases | Weight % in the 0-0.5 mm fraction of rejected fraction 23 | Weight % in filler 32 |
| --- | --- | --- |
| Portlandite | 6.05 | — |
| Merwinite | 20.98 | 48.93 |
| Akermanite | 7.87 | 11.44 |
| Bredigite | 12.32 | 10.15 |
| Calcio-olivine (γ-dicalcium silicate) | 14.84 | 1.59 |
| Larnite (β-dicalcium silicate) | 4.27 | 3.76 |
| Cuspidine | 17.56 | 13.20 |
| $MgCr_2O_4$ | 4.96 | 8.82 |
| Periclase | 5.76 | 2.11 |
| Quartz | 0.40 | — |
| Fluorite | 1.64 | — |

TABLE 1-continued

Mineralogical composition of the rejected fine fraction
23 and of the finely ground particles 32

| Crystalline phases | Weight % in the 0-0.5 mm fraction of rejected fraction 23 | Weight % in filler 32 |
| --- | --- | --- |
| Yavapaïte | 1.90 | — |
| Thaumasite | 1.45 | — |

As can be seen from these results, the remaining finely ground particles 32, whose main crystalline component is merwinite, have nearly ten times less γ-dicalcium silicate than the fine fraction 23, while maintaining approximately the same β-dicalcium silicate content. Free calcium oxide was not found since the steel slags were allowed to age under humid conditions so that it was transformed into calcium hydroxide (portlandite). The periclase (free MgO) content of the finely ground steel slag portion 32 was also significantly lower. As a result, the finely ground particles 32 showed good qualities as filler for construction material. Table 2 enumerates some of its basic physical properties.

TABLE 2

Physical properties of the stainless steel slag filler

| Test | Method | Result |
| --- | --- | --- |
| Real density | Helium pycnometry | 3390 kg/m³ |
| Steam swelling | EN 1744-1 | <0.4% vol. |
| Particles under 63 μm | Wet sieving | >98% |
| Water content | NBN EN 1097-5 | 0.30% |
| Water demand | β-P | 0.29 |
| Activity index | NF P18-508 | 0.74 |
| Blaine specific surface | NBN EN 196-6 | 3840 cm²/g |
| Hollow space | NBN EN 1097-4 and NBN EN 1097-7 | 33% |
| Bitumen number | NBN EN 13179-2 | 26 |

A water content of 0.30% enables the use of the filler in asphalt compositions, in which, according to European standard EN 13043 (2002), the water content of the filler may not be higher than 1% by weight; and makes the filler also appropriate for mortar and concrete compositions. Both according to the French standard NF P18-508 and according to the Dutch standard BRL 1804 the water content of inert additions to hydraulic concrete should indeed be smaller than 1%. The water demand (β-P value) is also an important parameter to determine whether the filler is suited for being used in hydraulic compositions.

As the solidified slag from which this filler 32 has been obtained is mostly crystalline, it does not show significant hydraulic properties. Hydration heat tests carried out according to the standard NBN EN 196-9 (2003) on mortar compositions corresponding to that prescribed by standard NBN EN 196-1 (2005), wherein 25% by volume of the prescribed amount of cement (either CEM I 42,5 R or CEM I 52,5 R) has been replaced by filler do not show a significant increase in activity by the use of this filler 32 in comparison with normally inert limestone and siliceous fillers. Table 3 shows the lack of impact of the use of this filler 32 in the hydration heat of the mortar.

TABLE 3

Heat emission after 41 hours [in J/g of cement]

|  | CEM I 42.5 R | CEM I 52.5 R |
|---|---|---|
| Stainless steel filler 32 | 348 | 439 |
| Siliceous filler (>99% wt. SiO$_2$) | 341 | 433 |
| Limestone filler (>97% wt. CaCO$_3$) | 343 | 441 |

Mortar Examples

The above described stainless steel slag filler 32 is more than adequate for use in mortars. Table 4 shows the compositions of four different mortars comprising either the stainless steel slag filler 32 or crushed limestone filler with either a conventional Portland cement (CEM I 42,5 R HES) or a composite cement containing GGBFS (CEM III/A 42,5 N LA).

TABLE 4

Mortar compositions

| Mortar | A | B | C | D |
|---|---|---|---|---|
| Stainless steel stag filler [g] | 375 | 375 | 0 | 0 |
| Limestone filler [g] | 0 | 0 | 300 | 300 |
| Portland cement [g] | 450 | 0 | 450 | 0 |
| GGBFS cement [g] | 0 | 450 | 0 | 450 |
| Standard sand NBN EN 196-1 [g] | 1350 | 1350 | 1350 | 1350 |
| Water [g] | 270 | 270 | 260 | 280 |
| Water/cement ratio | 0.60 | 0.60 | 0.58 | 0.62 |

In the mortars A and B, the limestone filler of the conventional mortars C and D has been replaced by the equivalent volume of stainless steel slag filler 32. Since the real density of the latter is 3390 kg/m$^3$, compared with 2700 kg/m$^3$ for the limestone filler, this results in a bigger mass of filler in the concrete mix. The quantity of water has been adjusted for each mix so as to obtain a similar consistency of the fresh mortar, as measured following NBN EN 1015-3:1999 by a spread of (200±5) mm on a vibrating table. It appeared that the mortar compositions with stainless steel slag filler did not require more water to achieve a same fluidity. The resulting density, consistency and air content of the four mortars are listed in Table 5.

TABLE 5

Properties of the fresh mortars

| Mortar | A | B | C | D |
|---|---|---|---|---|
| Density [kg/m$^3$] | 2300 | 2298 | 2260 | 2265 |
| Spread on vibrating table [mm] | 202 | 197 | 197 | 205 |
| Air content [%] | 3.5 | 3.3 | 3.2 | 3.0 |

The setting times of the four mortars have been measured according to NBN EN 480-2 and are represented in Table 6. The mortars A and B comprising stainless steel slag filler 32 rather than limestone filler are slower setting than the conventional mixes C and D which is advantageous for most applications.

TABLE 6

Setting times (averaged over 4 samples for each mix)

| Mortar | A | B | C | D |
|---|---|---|---|---|
| Initial setting time [min] | 355 | 480 | 245 | 295 |
| Final setting time [min] | 485 | 640 | 360 | 410 |

More importantly, the bending and compressive strengths of the four mortars after setting have also been measured according to NBN EN 196-1 (2005) after 28 days on mortar prisms with the dimensions 40×40×160 mm$^3$, and are represented in Table 7. The load increasing speeds were set at 3 kN/min for the bending test and at 144 kN/min for the compressive test. As apparent from these measurements, the mortar mixes A and B using the stainless steel slag filler 32 present a slightly higher compressive strength and slightly lower bending strength than the conventional concrete mixes C and D using limestone filler.

TABLE 7

Bending and compressive strength

| Mortar | A | B | C | D |
|---|---|---|---|---|
| Bending strength R$_n$ [N/mm$^2$] | 8 | 10 | 12 | 11 |
| Compressive strength R$_c$ [N/mm$^2$] | 53 | 56 | 49 | 48 |

Finally, tests have also been carried out on the shrinkage of mortar prisms after setting, as well as on its swelling under water (measured in accordance with NBN EN 480-3:1991). The shrinkage after 7 months of the mortars made of compositions A and C (both with Portland cement) was the same (about 900 µm/m) whilst for the mortars B and D comprising GGBFS cement, the shrinkage after 7 months of composition B (with stainless steel slag filler) was somewhat higher than the shrinkage of composition D (with limestone filler), namely respectively 750 µm/m and 550 µm/m. Replacing the limestone filler by the stainless steel slag filler did not change the swelling under water: the swelling was equal to 100 µm/m for the compositions A and C based on Portland cement and comprised about 200 µm/m for the compositions B and D based on the GGBFS cement.

Although the above-mentioned tests were carried out with conventional mortar compositions, the stainless steel slag filler 32 is particularly advantageous in Self-Compacting Concrete (SCC) compositions.

Concrete Examples

SCC compositions are concrete compositions that, in the fresh state, show a particularly high fluidity, thus permitting to fill entirely even complex moulds with dense reinforcements without requiring vibration, while showing sufficient resistance against segregation. To obtain this, SCC compositions contain a high proportion of paste (cement+filler+water+air), and a small proportion of coarse aggregate, so as to avoid strong friction between the coarse aggregate fragments. Also, the water/cement ratio is typically below 0.60, so as to prevent segregation. A typical SCC water/cement ratio may be 0.45. Superplastifiers, such as polycarboxylates, maintain the high fluidity of the SCC composition despite the low water content. The dosage of water, superplastifier and, eventually, viscosity enhancers, such a cellulose derivates, polysaccharides or colloidal solutions, can be varied to adjust the properties of the fresh and set SCC.

Fresh SCC compositions differ physically from other concrete compositions primarily in three properties:

The fluidity of the fresh SCC in an unrestricted space (slump flow), which may be measured by the spread of a predetermined amount of fresh SCC on a baseplate.

The fluidity of the fresh SCC in a restricted space, which may be measured by the flow of fresh SCC through a V-funnel, in an L-box and/or in a U-box.

The segregation resistance of the fresh SCC, which can be measured in a sieve segregation resistance test.

Various standards are known to the skilled person detailing how to perform these measures for qualifying a concrete composition as a SCC composition, such as those proposed in the above-mentioned European Guidelines for Self-Compacting Concrete, or in the proposed European standard prEN 206-100 and in the European standards EN 12350-8 to -12.

After setting, Self-Compacting Concrete results in a dense product with a smooth surface, usually generally devoid of large pores, cracks or other openings allowing infiltration by water or other fluids. This significantly reduces leaching, while increasing the durability of the product, both factors reducing the environmental impact of the stainless steel slag filler 32.

Table 8 shows the compositions of four different SCC mixes comprising either the stainless steel slag filler 32 or crushed limestone filler with either a conventional Portland cement (CEM I 52,5 N) or a composite cement containing GGBFS (CEM III/A 42,5 N LA). The superplasticizer used in these self-compacting concrete mixtures is a polycarboxylate-based superplasticizer sold under the trademark Glenium® by BASF Admixtures®.

TABLE 8

SCC compositions for 1 m$^3$

| SCC | A' | B' | C' | D' |
|---|---|---|---|---|
| Stainless steel slag filler [kg] | 0 | 0 | 226 | 226 |
| Limestone filler [kg] | 180 | 180 | 0 | 0 |
| Portland cement [kg] | 200 | 360 | 200 | 360 |
| GGBFS cement [kg] | 160 | 0 | 160 | 0 |
| River sand 0/5 [kg] | 789 | 789 | 789 | 789 |
| Limestone aggregate 4/7 [kg] | 218 | 218 | 218 | 218 |
| Limestone aggregate 7/10 [kg] | 218 | 218 | 218 | 218 |
| Limestone aggregate 10/14 [kg] | 201 | 201 | 201 | 201 |
| Limestone aggregate 14/20 [kg] | 252 | 252 | 252 | 252 |
| Superplasticizer [% by weight of cement] | 0.45 | 0.45 | 0.45 | 0.45 |
| Water [kg] | 180 | 180 | 180 | 180 |
| Water/cement ratio | 0.50 | 0.50 | 0.50 | 0.50 |

The resulting density and air content of the four fresh concrete mixes A', B', C' and D', as well as their slump and flow classes, determined according to the standards NBN EN 12350-2 and NBN 12350-5, are displayed in Table 8. Also displayed in Table 9 are the results of a slump-flow test performed using the same Abrams cone as in the slump test under NBN EN 12350-2. In this slump-flow test, the Abrams cone is paced on a flat, level surface and filled up with the fresh concrete mix. Once the Abrams cone is full, it is raised, and after the fresh concrete stops spreading on the level, flat surface the resulting mean spread diameter is measured.

TABLE 9

Properties of the fresh SCC mixes

| SCC | A' | B' | C' | D' |
|---|---|---|---|---|
| Density [kg/m$^3$] (NBN EN 12350-6) | 2375 | 2389 | 2399 | 2376 |
| Slump class [NBN EN 12350-2] | S5 | S5 | S5 | S5 |
| Flow class [NBN EN 12350-5] | F6 | F6 | F6 | F6 |
| Slump-Flow spread [mm] | 730 | 650 | 590 | 480 |
| Air content [% vol.] (NBN EN 12350-7) | 1.1 | 1.0 | 2.7 | 3.1 |

As can be seen from these results, the use of stainless steel slag filler 32 instead of conventional limestone filler does not significantly affect the consistency, density and viscosity, and therefore the workability of the fresh self-compacting concretes C' and D'.

Table 10 shows the average density of three concrete cubes of 15×15×15 cm$^3$ and the average compressive strength thereof, after 2, 28 and 90 days' setting. The cubes are taken out of their moulds after 24 hours and kept at 20° C. and over 95% relative humidity. As can be seen from this table, the use of stainless steel slag filler is not to the detriment of the compressive strength of the finished product.

TABLE 10

Density and compressive strength

| SCC | A' | B' | C' | D' |
|---|---|---|---|---|
| Density after 28 days [kg/m$^3$] | 2370 | 2360 | 2400 | 2380 |
| Compr. strength $R_c$ aft. 2 d. [N/mm$^2$] | 28 | 30 | 27 | 30 |
| Compr. strength $R_c$ aft. 28 d. [N/mm$^2$] | 67 | 64 | 67 | 68 |
| Compr. strength $R_c$ aft. 90 d. [N/mm$^2$] | 75 | 74 | 74 | 75 |

The concrete mixes were also tested for resistance to frost/thaw cycles (according to NBN B15-231). Concrete cubes of 15×15×15 cm$^3$ are moulded, then conserved during 14 days at 20° C. and over 95% relative humidity, then at 20° C. and 60% relative humidity. Table 11 compares the density and strength of such cubes (average of three cubes) before and after being submitted to 14 frost/thaw cycles of 24 hours each, according to standard NBN B 05-203. As evident from these results, the use of stainless steel slag filler 32 does not impair the resistance of the concrete to frost and thaw cycles.

TABLE 11

Density and compressive strength before/after frost/thaw cycles

| SCC | A' | B' | C' | D' |
|---|---|---|---|---|
| Initial density [kg/m$^3$] | 2350 | 2340 | 2370 | 2360 |
| Final density [kg/m$^3$] | 2360 | 2350 | 2390 | 2380 |
| Initial compr. strength $R_c$ [N/mm$^2$] | 65 | 67 | 61 | 69 |
| Final compr. strength $R_c$ [N/mm$^2$] | 69 | 68 | 69 | 71 |

Comparative Concrete Examples

In these examples the fine stainless fraction 23 containing 0-4 mm particles was further divided in a 0-0.5 mm fraction and a 0.5-4 mm fraction. The tests were then performed with the 0-0.5 mm fraction.

Based on known self-compacting concrete formulations made with limestone filler, the following self-compacting concrete compositions were made:

TABLE 12

SCC compositions for 1 m³

| SCC | A" | B" | C" |
|---|---|---|---|
| 0-0.5 mm stainless steel slag fraction [kg] | 203 | 203 | 203 |
| Portland cement [kg] | 360 | 360 | 360 |
| River sand 0/5 [kg] | 790 | 790 | 790 |
| Limestone aggregate 2/8 [kg] | 234 | 234 | 234 |
| Limestone aggregate 8/16 [kg] | 543 | 543 | 543 |
| Superplasticizer (glenium) (l) | 6 | 8.6 | 2.6 |
| Water [l] | 197 | 179 | 197 |
| Water/cement ratio | 0.50 | 0.45 | 0.50 |
| Cement/powder factor | 0.62 | 0.62 | 0.62 |

In the above table, the actual water content of the mixture is indicated. The fine stainless steel fraction had been stored under dry conditions but still contained about 8.5% by weight of water. Consequently, in practice 220 kg of stainless steel slag fraction was used in compositions A", B" and C" and respectively only 180, 162 and 180 litres of water.

In composition A" a high amount of superplasticizer was needed to achieve a sufficiently high fluidity. Due to the lower water/cement ratio of composition B even a higher amount of superplasticizer was needed in this composition. For economical reasons, the amount of superplasticizer was limited in composition C" to a usual amount for conventional SCC's, but this resulted in a non-self-compacting concrete requiring mechanical compaction.

Although compositions A" and B" were quite fluid, their workability rapidly decreased with time.

Further tests were done with the filler fraction (<0.063 mm) which was sieved by a wet sieving process out of the fine slag fraction of 0-0.5 mm. A same composition as composition A" was made, i.e. a composition containing the same amount of dry filler substance. However, since the filler contained about 57% of water, the water/cement ratio was always higher than 0.5 due to the water contained in the filler. Even after adding a large amount of superplasticizer, the mixture remained sticky, badly workable and no self-compacting properties could be achieved. Moreover, the compressive strength of the obtained concrete was very bad and comprised, after 28 days, only about half of the compressive strength obtained with the self-compacting concrete compositions A' to D' according to the invention. The fine fraction of the stainless steel slag is thus clearly not suitable at all to be used as filler.

Asphalt Compositions

The stainless steel slag filler produced according to the process of the invention can be used in different asphalt compositions, in particular in asphalt compositions used for the top and the base layers of road constructions.

Comparative tests according to European standard EN 13043 have been carried out on samples of the stainless steel filler 32, and on samples of the abovementioned filler fraction (<0.063 mm) sieved by a wet sieving process out of the γ-dicalcium-silicate-rich fine slag fraction 23 of 0-0.5 mm, and subsequently dried down to a 1% wt. water content. Table 13 shows the results of these tests.

TABLE 13

Comparative tests according to EN 13043

|  | Stainless filler 32 | Sieved fine slag fraction |
|---|---|---|
| Hollow space [% vol.] | 33 | 40 |
| Volumic mass [Mg/m³] | 3.418 | 2.951 |
| Bitumen number | 26 | 37 |
| Free CaO content [% wt] | 1.66 | 5.74 |

These tests show, in particular, a considerably lower bitumen number for the stainless steel filler 32 produced according to the abovementioned process, compared with the γ-dicalcium-silicate-rich filler. This is also consistent with a much higher percentage of hollow space and lower density of the γ-dicalcium-silicate-rich filler. Since the stainless steel filler 32 has also a considerably lower content of free lime, and, moreover, a much lower water absorption, it results that this filler 32 will be very appropriate for asphalt compositions.

An example of asphalt incorporating the stainless steel filler 32 is an asphalt concrete of the AB-3B type for road base layers. Table 14 shows the composition of asphalt concrete samples prepared with the stainless steel filler 32 according to this specification.

TABLE 14

Asphalt sample composition

|  | Content [in wt. % of the dry aggregate] |
|---|---|
| Limestone 6.3/14 | 33.03 |
| Limestone 2/6.3 | 22.13 |
| Limestone sand 0/2 | 21.62 |
| Well sand 0/1 | 17.34 |
| Stainless steel filler 32 | 5.88 |
| Bitumen B35/50 | 4.6 |

Samples of such an asphalt concrete composition show an average 4.1% vol. hollow space. They also show a very low water sensitivity: the average indirect tensile strength (ITS) of untreated samples is of 3.41 MPa, whereas that of samples which are treated according to EN 12697-12 by vacuum-saturation first and then 72 hours immersion in water is only reduced to 2.88 MPa, resulting in an excellent ITS ratio (ITSR) of 85%, especially in view of the relatively small amount of bitumen in the composition. The treated samples expand by only 0.5% in average.

This asphalt concrete composition also presents a good resistance to rut formation. Proportional rut depth values in a test according to EN 12697-22 using a large size device with a vertical axle load of 5 kN, a tire pressure of 600 kPa at 50° C. are presented in Table 15:

TABLE 15

Rut formation resistance test according to EN 12697-22

| Number of cycles | Average proportional rut depth [in % of the nominal sample thickness] |
|---|---|
| 1000 | 3.6 |
| 3000 | 4.3 |
| 10000 | 5.3 |
| 20000 | 5.7 |
| 30000 | 5.8 |
| 50000 | 6.4 |

These results show a good rigidity of asphalt concrete layers produced with the stainless steel filler 32.

Heavy Metal Content/Leaching Tests

The mortar compositions A and B described hereabove under the heading "Mortar examples" were made with a stainless steel slag filler which resulted from the production of austenitic nickel-chromium steel and which therefore contained a relatively high amount of nickel and chromium. The results in table 16 indicate however that when using this filler in a hydraulic mortar composition, the leaching standards, as set in particular by the Flemish and Walloon authorities, are not exceeded so that the stainless steel slag filler can be safely used in hydraulic or bituminous construction materials. Some leaching results were even better than the results of the reference mortars which may be explained by a relatively large variation in the measurements (tests have been done with no repetitions). Tests with asphalt compositions have also demonstrated that the leaching standards are not exceeded when the filler according to the invention is used in these compositions.

TABLE 16

Heavy metal contents and leaching results of prisms of mortar compositions A to D of table 3 compared with the Flemish and Walloon standards.

| Method | Parameter | element | unit | Walloon standard | Flemish standard | Mortar composition | | | |
|---|---|---|---|---|---|---|---|---|---|
| | | | | | | A | B | C | D |
| Total analysis | | Cr | mg/kg | | 1250 | 1060 | 1060 | 28 | 30.8 |
| | | Cr(VI) | mg/kg | | | <0.4 | <0.4 | <0.4 | <0.4 |
| | | Ni | mg/kg | | 250 | 190 | 181 | 13.8 | 7.6 |
| Shake test | | Cr | mg/l | | | 0.02 | 0.02 | 0.04 | 0.02 |
| DIN 38414-S4 | | Cr(VI) | mg/l | 0.1 | | <0.02 | <0.02 | <0.02 | <0.02 |
| | | Ni | mg/l | 0.2 | | <0.005 | <0.005 | <0.005 | <0.005 |
| Column test | | Cr | mg/kg | 0.5 | 0.5 | 0.2 | 0.4 | 0.4 | 0.1 |
| NEN 7343 | | Cr(VI) | mg/l | 0.05 | | <0.02 | <0.02 | <0.02 | <0.02 |
| | | Ni | mg/kg | 1.8 | 0.75 | <0.05 | <0.05 | <0.05 | <0.05 |
| Diffusion tank test | total emission | Cr | mg/m$^2$ | | | 0.53 | 0.34 | 2.86 | 1.82 |
| NEN 7345 | | Ni | mg/m$^2$ | | | 0.24 | 0.24 | 1.52 | 1.52 |
| | Immission over 100 years | Cr | mg/m$^2$ | | 555 | 1.97 period 3-6 | no immission | 14.78 period 1-3 | no immission |
| | | Ni | mg/m$^2$ | | 136 | no immission | no immission | no immission | no immission |
| Maximum availability test NEN 7341 | Availability | Cr | mg/kg | | | 1.92 | 1.26 | 13.89 | 6.30 |
| | | Ni | mg/kg | | | 15.66 | 29.20 | 10.19 | 5.04 |

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The filler according to the invention can for example be used in different amounts to prepare the mortar or the concrete. The mortar or concrete composition comprises however preferably at least 2% by weight, more preferably of at least 3% by weight and most preferably of at least 5% by weight filler dry matter on the total dry matter of the composition. In an asphalt composition, the filler fraction of the asphalt comprises preferably at least 20% by weight, more preferably at least 40% by weight and most preferably at least 60% by weight of the filler according to the invention.

The invention claimed is:

1. A process for preparing, starting from a slag material, a filler for use in construction materials which contain a hydraulic or bituminous binding agent, characterised in that use is made of a slag material containing γ-dicalcium silicate; and in that the process comprises the steps of:

removing a finer fraction from the slag material to divide the slag material in said finer fraction and in a coarser fraction, wherein the coarser fraction comprises crystalline phases and has a γ-dicalcium silicate content which is less than 4% by weight of said crystalline phases, wherein the coarser fraction comprises particles having a particle size greater than 0.75 mm, and wherein the finer fraction comprises particles having a particle size that is smaller than the particle size of the particles of the coarser fraction; and finely milling at least a portion of said coarser fraction of the slag material to obtain a filler, from only the coarser fraction, of which at least 50% by weight is formed by particles not bigger than 63 μm.

2. A process according to claim 1, characterised in that said slag material comprises a steel slag.

3. A process according to claim 1, characterised in that it additionally comprises the step of breaking the slag material into fragments smaller than a size x before removing said finer fraction from the slag material, wherein said size x is at most 50 mm, but larger than 2.0 mm.

4. A process according to claim 3, characterised in that it further comprises the step of removing metal from the slag fragments.

5. A process according to claim 4, characterised in that after having removed said metal and said finer fraction from the slag material, the coarser fraction of the slag material is divided in at least a first portion and in a second portion which has a lower metal content than the first portion, said portion of the coarser fraction of the slag material which is finely milled to obtain the filler being said first portion of the slag material.

6. A process according to claim 1, characterised in that said finer fraction is removed from the slag material by sieving the finer fraction out of the slag material and/or by washing it out of the slag material.

7. A process according to claim 1, characterised in that it further comprises the step of removing metal from said portion of the coarser slag material fraction after said fine milling step.

8. A process according to claim 7, characterised in that said metal is removed out of the finely milled portion of the coarser slag material fraction by a dry separation process.

9. A process according to claim 1, characterised in that the fine milling step is carried out by dry milling.

10. A process according to claim 1, characterised in that said filler is less than 50% amorphous by weight.

11. A process according to claim 1, characterised in that said portion of the coarser slag material fraction is finely milled so that said filler has a Blaine value of at least 2000 cm$^2$/g.

12. A process according to claim 1, characterised in that said portion of the coarser slag material fraction is finely milled so that at least 60% by weight of the filler is formed by particles not bigger than 125 μm.

13. A process according to claim 1, wherein the coarser fraction comprises particles having a particle size greater than about 1.0 mm.

14. A process according to claim 1, wherein the coarser fraction comprises particles having a particle size greater than about 1.5 mm.

15. A process according to claim 1, wherein the coarser fraction comprises particles having a particle size greater than about 2.0 mm.

16. A process according to claim 1, characterised in that at least 60% by weight of said filler is formed by particles not bigger than 63 μm.

17. A process according to claim 1, characterised in that said filler is less than 30% amorphous by weight.

18. A process according to claim 1, characterised in that said portion of the coarser slag material fraction is finely milled so that said filler has a Blaine value of at least 3000 cm$^2$/g.

19. A process according to claim 1, characterised in that said portion of the coarser slag material fraction is finely milled so that at least 80% by weight of the filler is formed by particles not bigger than 125 μm.

20. A process according to claim 1, characterised in that the γ-dicalcium silicate content of said coarser fraction is less than 3% by weight of said crystalline phases thereof.

21. A process according to claim 1, characterised in that the γ-dicalcium silicate content of said coarser fraction is less than 2% by weight of said crystalline phases thereof.

22. A process according to claim 2, characterised in that said steel slag is a stainless steel slag.

23. A process according to claim 3, characterised in that said size x is at most 30 mm.

24. A process according to claim 3, characterised in that said size x is at most 20 mm.

25. A process according to claim 3, characterised in that said size x is larger than 4 mm.

26. A process according to claim 3, characterised in that said size x is larger than 8 mm.

27. A process according to claim 3, characterised in that said size x is larger than 10 mm.

* * * * *